United States Patent [19]

Pangburn

[11] 4,341,966

[45] Jul. 27, 1982

[54] LAMINATED DYNAMOELECTRIC MACHINE ROTOR HAVING CAST CONDUCTORS AND RADIAL COOLANT DUCTS AND METHOD OF MAKING SAME

[75] Inventor: William W. Pangburn, Schenectady, N.Y.

[73] Assignee: General Electric Co., Schenectady, N.Y.

[21] Appl. No.: 157,576

[22] Filed: Jun. 9, 1980

[51] Int. Cl.³ .............................................. H02K 9/19
[52] U.S. Cl. ........................................ 310/61; 310/64
[58] Field of Search ...................... 310/61, 64, 65, 211

[56] References Cited

U.S. PATENT DOCUMENTS

| | | |
|---|---|---|
| 890,577 | 6/1908 | Richards . |
| 2,176,871 | 10/1939 | Harrell et al. . |
| 2,370,458 | 2/1948 | Goran . |
| 2,486,798 | 11/1949 | Mollenhauer . |
| 2,504,823 | 4/1950 | George . |
| 2,504,824 | 4/1950 | George .......................... 164/333 X |
| 2,504,825 | 4/1950 | Meyer et al. . |
| 2,607,969 | 8/1952 | Evans et al. . |
| 2,944,171 | 7/1960 | Alger . |
| 2,956,186 | 10/1960 | Wall . |
| 3,166,804 | 1/1965 | Satola . |
| 3,462,625 | 8/1969 | Endress . |
| 3,597,645 | 8/1971 | Duffert et al. ..................... 310/65 X |
| 3,684,906 | 8/1972 | Lenz ...................................... 310/61 |
| 4,061,937 | 12/1977 | Goel et al. ............................ 310/65 |
| 4,301,386 | 11/1981 | Schweder et al. ................ 310/65 X |

Primary Examiner—Donovan F. Duggan
Attorney, Agent, or Firm—Vale P. Myles

[57] ABSTRACT

A rotor comprising stacked laminations having conductor slots and axial passageways provided with closed-slot spacer assemblies that are stacked in groups between selected axially spaced rotor laminations to hold said laminations apart while sealing the conductor slots thereby to form radial cooling ducts through the laminations of the selected axially spaced groups and around the closed-slot spacer assemblies. According to the method of the invention, the spacer assemblies are secured in selected operating position by being staked to certain of the main rotor laminations, and a characteristic staking procedure is used to secure individual plates of each of the assemblies together.

13 Claims, 7 Drawing Figures

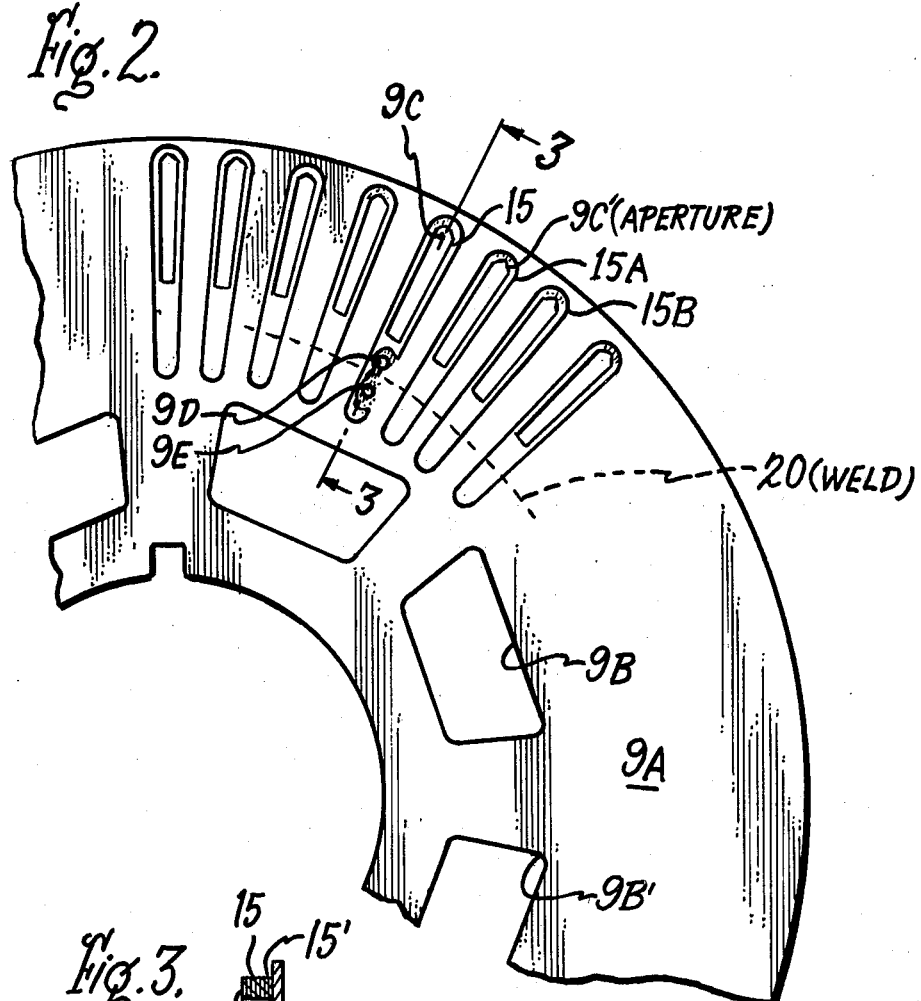
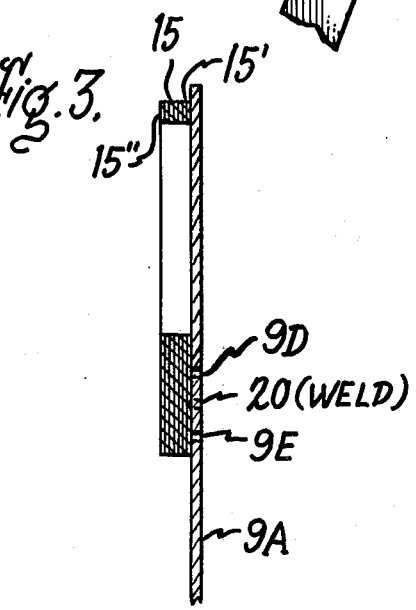

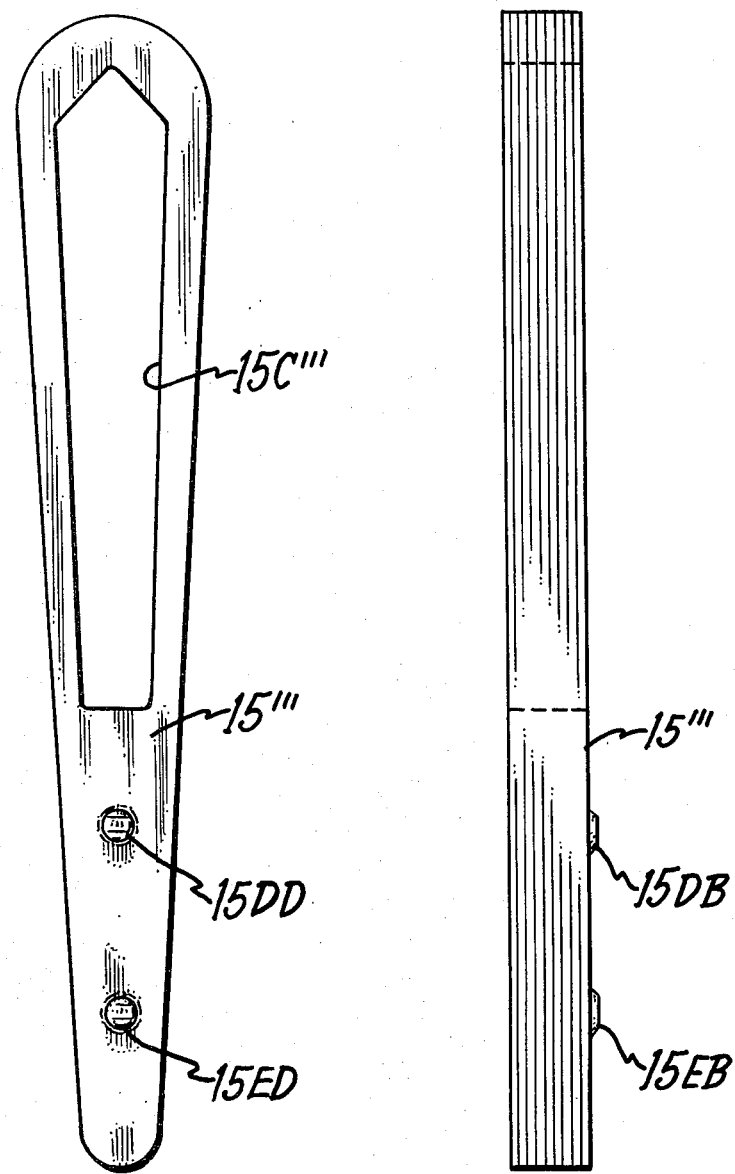

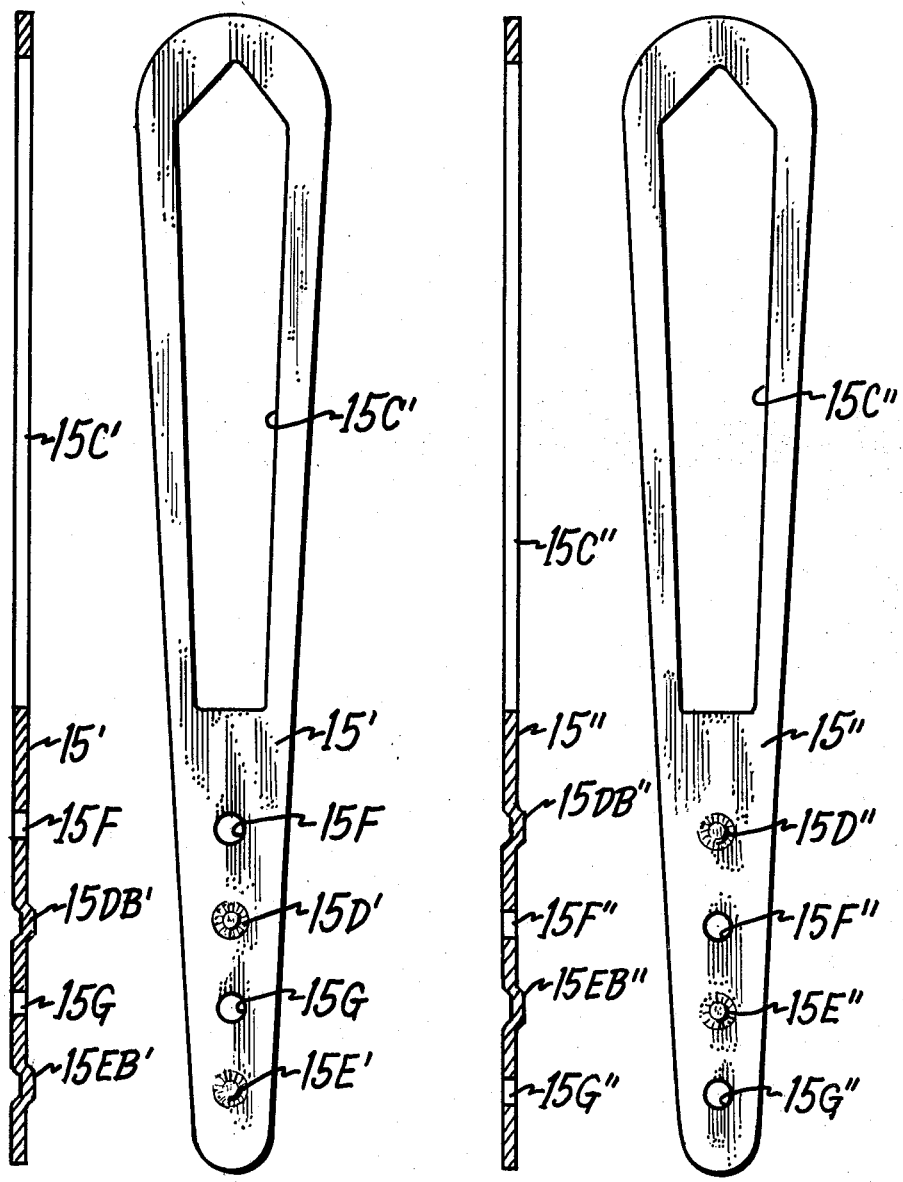

LAMINATED DYNAMOELECTRIC MACHINE ROTOR HAVING CAST CONDUCTORS AND RADIAL COOLANT DUCTS AND METHOD OF MAKING SAME

BACKGROUND OF THE INVENTION

The invention relates to laminated rotor structure for a dynamoelectric machine and to a method for manufacturing such structures. More particularly, the invention relates to a laminated rotor structure formed of a plurality of groups of rotor laminations that are held in spaced relationship by a plurality of laminated spacer assemblies which also serve to seal conductor-receiving passageways through the rotor from axial coolant ducts, thereby to enable molten metal to be poured into the conductor-receiving slots to form cast conductors in the rotor. The laminated plates of each of the spacer assemblies are secured in desired fixed relationship to one another and in predetermined fixed relationships with respective groups of rotor laminations on which sets of the spacer assemblies are mounted. In the method of the invention the laminations or plates of each spacer assembly are formed in two or three different configurations to enable the spacer assemblies to be reliably and economically manufactured and assembled in desired operating positions on predetermined, and suitably pre-formed, rotor laminations.

Heretofore a number of different dynamoelectric machine rotor structures and associated methods of manufacture were well known for producing rotors that employ cast conductors in combination with radial cooling ducts through the rotors and past such conductors. A common early form of such prior art used casting pins between selected groups of rotor laminations to contain molten conductor metal in conductor-receiving passageways and seal it from associated areas of radial coolant ducts when the molten metal is poured into the passageways to cast the conductors. After that type of casting operation, the pins would be removed from between the groups of laminations thus leaving voids that define cooling passageways around the conductors and between the groups of laminations. An example of such a prior art structure is shown in U.S. Pat. No. 2,504,824, which issued on Apr. 18, 1959. A related prior art approach is shown in U.S. Pat. No. 2,486,798, which issued on Nov. 1, 1949. In that second patent a plurality of removable metal clips are used to hold groups of rotor laminations in spaced relationship while conductors are cast in the rotor. After the casting operation the clips are stripped from the rotor.

Alternative methods of forming such cast rotors are shown in U.S. Pat. Nos. 2,370,458 which issued Feb. 27, 1945 and 2,504,823 which issued Apr. 19, 1950 and 2,607,969, which issued Aug. 26, 1952. In each of these patents, a plurality of groups of rotor laminations are spaced apart by destructible molds formed of plaster of Paris or other relatively easily removable material, such as cardboard. The destructible or removable materials act to block molten metal from the areas of the rotors that are to serve as coolant ducts after conductors have been cast in place in conductor slots extending axially through the rotor laminations. Although the use of such casting forms eliminates the requirement of placing, then subsequently removing, a large number of casting pins, as was required by the type of rotor forming operations characterized by the first group of patents noted above, such removable spacers also involve inherent disadvantages. In addition to the high cost of forming, then subsequently removing such molding materials from between groups of rotor laminations, such manufacturing techniques have the further disadvantage that no permanent mechanical spacer, other than portions of the cast conductors, are left in the rotor assembly to secure the respective groups of laminations in their desired spaced relationship.

In order to overcome such disadvantages, later rotor manufacturing techniques were developed, which employed permanent spacers between groups of rotor laminations. Examples of such later rotor structures are shown in U.S. Pat. Nos. 2,956,186, which issued Oct. 11, 1960 and 3,166,804 which issued Jan. 26, 1965 and 3,462,625 which issued Aug. 19, 1969. In the respective inventions shown in these latter three patents, a plurality of metal spacers are mounted between groups of rotor laminations and around conductor passageways through the laminations to simultaneously hold the groups of laminations in spaced relationship and prevent molten conductor metal from entering portions of the coolant ducts through the rotor. Such manufacturing techniques and resultant structures involve the inherent disadvantage that they require the use of a large number of separate parts to form a rotor, and also result in the risk that some of the plurality of spacing loops or clips may be thrown from the rotor when it is operated. Of course, any such undesirable movement of such spacing clips between the groups of rotor laminations could cause the clips to wedge between the rotor and an associated stator thereby causing extensive damage to a machine.

In earlier prior art devices, in order to avoid such movement of rotor lamination spacing means, it was at one time a common practice to weld such spacers and coolant duct forming means in position on the respective groups of laminations. An example of such prior art welding techniques and associated laminated rotor structure is shown in U.S. Pat. No. 2,176,870 which issued on Oct. 24, 1939. Of course, the expense of forming such a plurality of welds in a rotor assembly constitutes a major disadvantage of that type of prior art arrangement. One form of known prior art structure that avoids the use of such welds, while providing convenient means for quickly and accurately positioning a plusality of rotor lamination spacers between selected groups of laminations in order to hold them in spaced relationship, while at the same time providing means for blocking molten conductor metal from flowing into coolant ducts of the rotor assembly, is shown in U.S. Pat. No. 2,504,825 which issued on Apr. 18, 1950. In that patent a plurality of laminated spacer assemblies are each formed with an integral annular band that positions respective teeth of the assembly in desired fixed relationship so that the assemblies can be readily stacked in position between groups of rotor laminations. After molten conductors are cast in passageways defined by apertures through the main rotor laminations and aligned apertures in the respective teeth of the spacer assemblies, the annular positioning portions of each of the spacer assemblies are machined away so that the teeth remain locked in position in the rotor assembly. A disadvantage of such a prior art structure and manufacturing method is that no convenient means are disclosed for readily and accurately positioning the respective teeth relative to each conductor-receiving aperture in the rotor laminations, except for the annual holding rings associated with the teeth. Of course, the cost of separately machining away the integral teeth-holding rings is a further disadvantage of such a prior art manufacturing process. That prior art patent also makes brief reference to the fact that such laminated spacer teeth may be held in position, prior to a conductor-casting operation, by a suitable jib, in lieu of using an integral annular positioning member associated with the respective teeth. A major disadvantage of such a jib process is that a large number of separate pieces are necessarily required to assemble a given rotor lamination spacer. Moreover, the mounting of such a jib during a casting operation, and its subsequent removal from the cast rotor, would increase manufacturing costs.

Some of the disadvantages of the prior art types of inventions discussed above can be avoided by using a plurality of differently configured sets of rotor laminations to build up desired coolant passageways through a rotor, while at the same time providing means for defining fluid-tight passageways through the rotor in which moltent conductor metal can be poured to cast conductors. Examples of such prior art devices, using a plurality of differently configured groups of rotor laminations, is shown in U.S. Pat. Nos. 890,577, issued June 9, 1908 and 2,944,171 issued July 5, 1960 and 3,684,906 issued Aug. 15, 1972 and assigned to the assignee of the invention of the present application. While this general type of rotor construction has been found desirable for many applications, it necessarily involves the use of a plurality of different configurations of rotor laminations; thus, the expense of manufacturing such rotors is undesirably increased by the requirements of different types of dies to make the respective laminations and by the need to store supplies of the different configurations of laminations, as well as by the added expense required to carefully arrange the groups of laminations in proper sequence while practicing such a manufacturing process.

As can be understood from the brief description of the number of prior art dynamoelectric machine rotor structures and manufacturing methods given above, it would be desirable to provide a rotor structure and manufacturing process that avoids the disadvantages associated with each of those prior art devices and processes. Accordingly, it is a primary object of the present invention to provide a laminated rotor structure having cast conductors and radial coolant ducts, and including permanent spacer assemblies between groups of rotor laminations, while at the same time overcoming or avoiding the types of disadvantages discussed above with reference to the prior art inventions disclosed in the respective patents noted above.

Another object of the invention is to provide a method of manufacturing a laminated rotor having laminated spacer assemblies mounted in the rotor between groups of main rotor laminations and locked in fixed relationship to the groups of rotor laminations by commercially feasible and relatively inexpensive mounting means that reliably secure the spacing assemblies against movement relative to the main rotor laminations.

A further object of the invention is to provide a method for manufacturing a laminated rotor assembly in which a plurality of laminated spacer assemblies are efficiently produced on high speed punching machines, stacked into spacer assemblies of predetermined size, and staked together to form easily usable components for fabricating a rotor assembly.

Additional objects and advantages of the invention will become apparent to those skilled in the art from the description of the invention presented herein considered in conjunction with the accompanying drawings.

SUMMARY OF THE INVENTION

In a preferred form of the invention disclosed herein, a laminated rotor for a dynamoelectric machine is formed with a plurality of groups of main rotor laminations mounted in spaced relationship with a plurality of laminated spacer assemblies disposed between respective groups of the main rotor laminations. Each laminated spacer assembly is characterized by including a plurality of apertured plates that are staked together and include a pair of spaced bosses on one outer surface of the spacer assembly. The pair of spaced bosses are positioned in a matching pair of apertures in an outer main rotor lamination of an adjacent group of rotor laminations, thereby to align the apertures through each of the spacer assemblies with conductor-receiving passageways through the adjacent groups of rotor laminations. Thus mounted, the spacer assemblies seal the conductor-receiving passageways from radial coolant ducts that surround the spacer assemblies, accordingly, molten metal can be cast through the conductor passageways to form conductors. In the preferred method of the invention, each laminated spacer assembly is formed of a plurality of plates each of which includes a conductor aperture. Each such plate also includes a pair of spaced bosses and associated recesses or depressions opposite the bosses. Each of the recesses are for receiving therein the bosses of an adjacent plate, except for the recesses in the two outermost plates of each assembly. The two outer plates of each spacer assembly are each formed with a pair of spaced apertures in addition to the pair of bosses formed therein. The apertures in one of the outer plates is to receive, respectively, therein the bosses of an adjacent plate in the spacer assembly. The pair of apertures in the other outer plate is positioned to enable groups of the apertures to be quickly manufactured on an automatic punch press and assembled in groups of a predetermined number of plates, without permitting the plates of one spacer assembly to become staked to the plates of a separate, sequentially punched spacer assembly.

BRIEF DESCRIPTION OF THE DRAWINGS

FIG. 2 is a plan view of one of the main rotor laminations shown in FIG. 1, illustrating a plurality of laminated spacer assemblies, such as those shown in FIG. 1, staked to the rotor lamination.

FIG. 3 is an enlarged side elevation view, partly in cross section along the plane 3—3, of the main rotor lamination shown in FIG. 2 and one of the laminated spacer assemblies mounted thereon according to the invention.

FIG. 4 is a plan view of one of the intermediate plates of the spacer assemblies shown in FIG. 3, depicting the full length of the plates and a pair of recesses formed near one end thereof.

FIG. 5 is a side view of the intermediate plate of the spacer assembly shown in FIG. 4, illustrating a pair of bosses formed adjacent one end thereof, according to the present invention.

FIG. 6 is a plan view of one of the outer plates of the spacer assembly shown in FIG. 3, which outer plate is mounted adjacent to a main rotor lamination, as seen in FIG. 3. This Figure illustrates a pair of recesses formed in the plate according to the invention, and also depicts a pair of spaced apertures used to receive therein the respective bosses on a next adjacent intermediate plate of the spacer assembly, as shown in FIGS. 4 and 5.

FIG. 6A is a fragmentary, side elevation of the outer plate of the spacer assembly shown in FIG. 6, depicting two spaced bosses that are used to position and secure the plate to the main rotor lamination, as shown in FIG. 3.

FIG. 7 is a plan view of the other outer plate of the spacer assembly shown in FIG. 3, illustrating the outer plate of that assembly most remote from the main rotor lamination on which the spacer assembly is mounted. This drawing illustrates a pair of spaced apertures that are arranged to be in alignment with the bosses on the other outer plate of the assembly (or of a sequentially manufactured similar assembly), of the type shown in FIG. 6.

FIG. 7A is a fragmentary side elevation of the plate shown in FIG. 7, depicting a pair of spaced bosses used to secure the plate to the next adjacent intermediate plate of the spacer assembly, as shown in FIG. 3.

DESCRIPTION OF THE PREFERRED EMBODIMENTS

Figure 1:
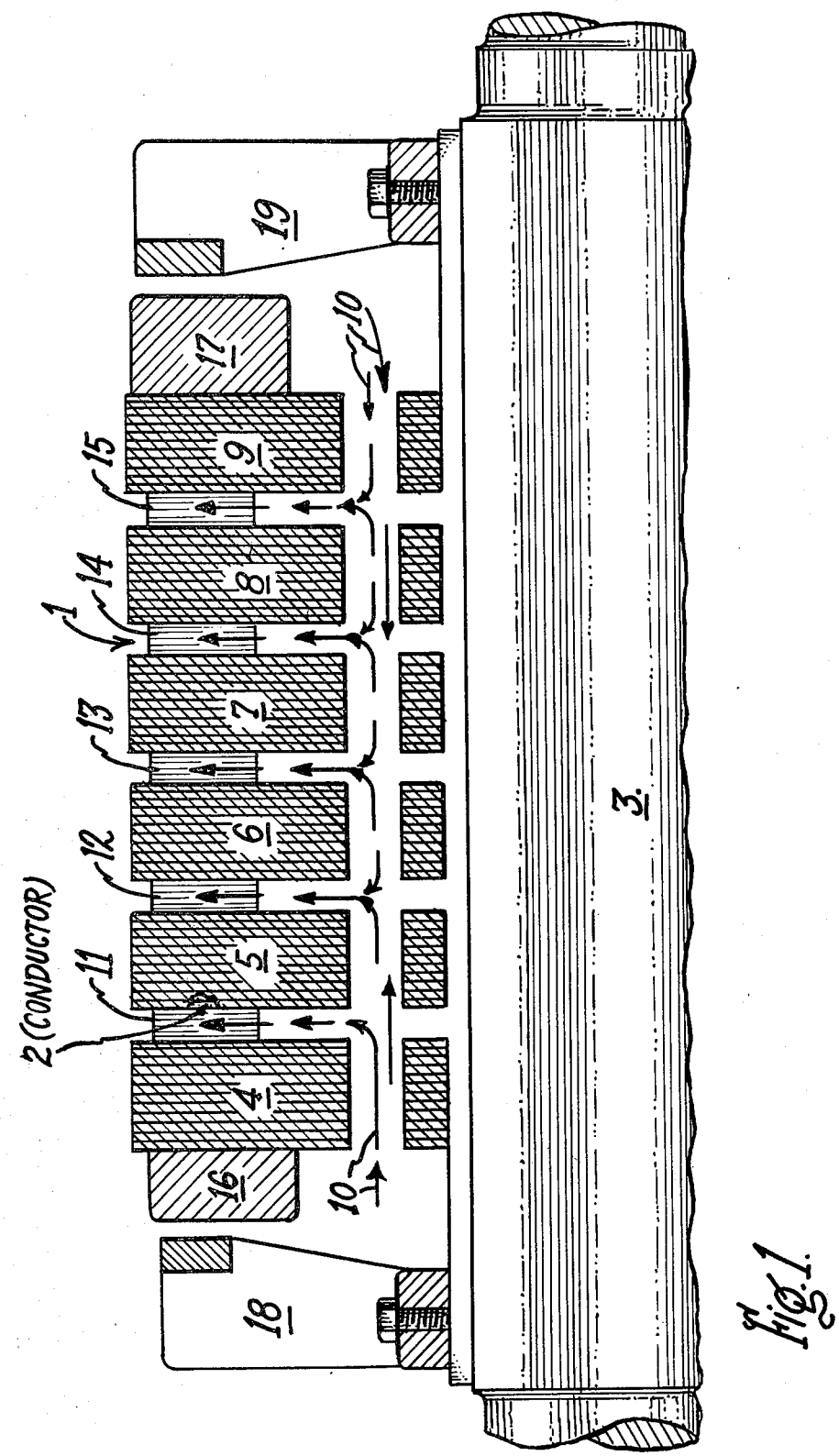
FIG. 1 is a side elevation view, partly in cross-section along a central axis of a dynamoelectric machine rotor constructed of a plurality of groups of main rotor laminations and a plurality of laminated spacer assemblies secured in operating position between the respective groups of main rotor laminations according to the present invention.

A preferred embodiment of the structure of a laminated rotor having cast conductors and constructed according to the teachings of my invention, now will first be described with reference to FIG. 1 and the other drawing Figures, then a detailed description will be given of the process steps employed in the preferred steps of the method of the invention. Accordingly, referring now to FIG. 1, it will be seen that there is shown a laminated rotor 1 that includes a plurality of axially-extending, cast conductors disposed at arcuately spaced points around the periphery of the rotor, in a manner generally well known in the motor industry. One such cast conductor 2 is partially depicted in FIG. 1 in the broken away area of the laminated rotor assembly positioned near the left end of the rotor. In addition to a suitable, conventional steel axle shaft 3 the rotor includes a plurality of groups of rotor laminations 4 through 9. These groups of laminations are arranged to define fluid coolant passageways that extend axially along the rotor as shown by the arrows 10 in FIG. 1. Also, each of the main rotor laminations in the respective groups of laminations 4-9 is provided with a plurality of arcuately spaced, axially-extending apertures or passageways adjacent the peripheral surface of the stacked rotor laminations to define conductor slots or passageways for receiving molten metal that forms cast conductors in the slots in a generally well known manner.

According to the present invention, a plurality of laminated spacer assemblies, one series of which is seen as the spacer assemblies 11, 12, 13, 14 and 15 are disposed respectively, around the conductors, such as conductor 2 in FIG. 1. The laminations in each of the groups of main rotor laminations 4-9, and the plates defining each of the plurality of laminated spacer assemblies, such as the illustrated assemblies 11-15, are held in compressed relationship by the pair of cast conductor rings 16 and 17, which are cast integrally with the plurality of cast conductors, such as conducted 2, in a generally well known manner. Finally, the rotor 1 includes a pair of fans 18 and 19, mounted respectively adjacent opposite ends of the shaft 3, with any suitable conventional mounting means, to drive coolant such as air axially through the passageways 10. Except for the spacer assemblies 11-15 and the characteristic features of at least some of main rotor laminations which will be explained below, the structure of a rotor illustrated and described in this preferred embodiment may be designed and assembled in any suitable, generally well known manner, as explained, for example, in more detail in the above mentioned U.S. Pat. No. 3,684,906-Lenz. Accordingly, further detailed description of such well known structural features and rotor assembly processes will not be given here. Before referring to the other figures of the drawings, however, it should be noted that the arrangement of the groups of rotor laminations 4-9 relative to the laminated spacer assemblies 11-15, etc., serves to define a plurality of radial coolant ducts that extend from the axial coolant passageways 10 between the groups of rotor laminations and around the laminated spacer assemblies, such as assemblies 11-15, so that coolant can follow those paths into the air gap defined by the circumferential surface of the rotor and an associated stator assembly (now shown), in a generally well known manner.

Referring now to FIGS. 2 and 3, certain characteristic features of the invention will be described in more detail. In FIG. 3 there is shown a single main rotor lamination 9A having mounted thereon a plurality of laminated spacer assemblies 15, 15A, 15B, etc. At this point, it should be understood that in practicing the invention each main rotor lamination may be made substantially identical in configuration to all of the other main rotor laminations, thus affording economies of standardization. All of the main rotor laminations include a plurality of arcuately spaced coolant apertures, such as the plurality of coolant apertures 9B, 9B', etc., spaced around the central bore in the main rotor lamination 9A, as shown in FIG. 2. In addition, each of the main rotor laminations includes a plurality of conductor apertures, such as the apertures 9C, 9C', etc., positioned at arcuately spaced points adjacent the periphery of the laminations, as shown on the lamination 9A in FIG. 2. A primary advantage of the present invention is that it enables a cast-rotor lamination to be formed by using a single configuration of punchings to form all of the groups of main rotor laminations, rather than requiring a larger number of differently configured rotor laminations to define tortuous coolant ducts, vents and passageways through the rotor in the manner disclosed, for example, in the above mentioned Lenz patent. Because of this simplified arrangement, only one of the main rotor laminations 9A, as shown in FIGS. 2 and 3, will be described in detail herein.

In fact, as will be understood from the description of the invention presented hereinafter, in some embodiments of the invention the main rotor laminations in the groups 4-9 may be made up of two different configurations of laminations to optimize the magnetic capabilities of a given rotor. Accordingly, in the most preferred mode of the invention disclosed here, two such differently configured sets of rotor laminations are employed.

As is the case with the relatively standardized rotor laminations used in practicing the disclosed embodiment of the invention, each of the laminated spacer assemblies, such as assemblies 15, 15A, 15B, etc., shown in FIG. 2, used between the respective groups of main rotor laminations 4–9, are made substantially identical to one another. Accordingly, to explain the present invention only one of the spacer assemblies 15 will be described in detail with reference to FIGS. 3–7.

The spacer assembly 15 comprises a plurality of metal plates including a first outer plate 15′, positioned closest to the rotor lamination 9A and a second outer plate 15″ positioned most remotely in the stack of spacer laminations of assembly 15 from the rotor lamination 9A. Between the two outer plates 15′ and 15″, there are stacked a plurality of intermediate laminations or plates, designated generally by the numeral 15 in FIG. 3. It will be understood that in order to change the spacing distance between the groups of main rotor laminations 4–9, it is only necessary to increase the number of plates in the respective plurality of spacer assemblies, such as the spacer assembly 15 illustrated in FIG. 3. The first outer plate 15′ of spacer assembly 15 is shown in greater detail in FIGS. 6 and 6A of the drawing, and the other outer plate 15″, spaced most remotely from the main rotor lamination 9A, is shown in greater detail in FIGS. 7 and 7A. One of the intermediate laminations, also designated by the numeral 15‴, is shown in FIGS. 4 and 5. These more detailed illustrations of the respective plates of the spacer assembly 15 are used to clearly disclose the locking means employed, according to the invention, for securing the respective plates of each spacer assembly in stacked relationship and for defining the mounting means used to fasten each of the spacer assemblies, respectively, to an associated main rotor lamination, such as the lamination 9A illustrated in FIGS. 2 and 3. All of the differently configured plates 15′, 15″ and 15‴ of spacer assembly 15 include wall means of a preselected configuration that define, respectively, a conductor-receiving aperture through each plate. Thus, in first outer plate 15′ an aperture 15C′ shown in FIG. 6, is formed by punching or other suitable machining as is generally well known. Likewise, in intermediate plate 15‴ shown in FIG. 4, a similar aperture 15C‴ is formed and in the other outer plate 15″, seen in FIG. 7, a like aperture 15C″ is punched or otherwise suitably formed. When arranged in their desired stacked relationship to define the spacer assembly 15, the respective conductor apertures in all of the plates of each spacer assembly are positioned in alignment to define a conductor-receiving passageway through the assembly.

The locking means used in the disclosed embodiment of the invention for securing the plates of the respective spacer assemblies to one another comprises interlocking staked portions on each of the adjacent plates of the spacer assemblies. For example, in the spacer assembly 15 each of the intermediate plates 15‴ includes two spaced staked portions that comprise the respective depressions 15DD and 15ED, in one side thereof, and corresponding spaced bosses 15DB and 15EB on an opposite side of the plate, as seen in FIGS. 4 and 5. In this preferred embodiment of the invention the two staked portion 15DD-DB and 15ED-EB are positioned on a line that generally parallels the longitudinal axis of the conductor-receiving aperture 15C‴ in the plate. Moreover, one of the staked portions 15ED-EB is positioned adjacent to the end of the plate that is furthest from the aperture 15C‴ therein.

The first outer plate 15′ of spacer assembly 15 also include two staked portions that define, respectively, recesses 15D′ and 15E′ on one side of the plate, as seen in FIG. 6, and corresponding bosses 15DB′ and 15EB′, as seen in FIG. 6A. Finally, the other outer plate 15″ of the spacer assembly 15, as shown in FIG. 7, contains a pair of spaced, staked portions that define, respectively, depressions 15D″ and 15E″ in one side thereof and corresponding bosses 15DB″ and 15EB″ in the opposite side of the plate, as seen in FIG. 7A. When the respective plates of the spacer assembly 15 are stacked together, as shown in FIG. 3, the locking means of the invention comprising the staked portions on the respective plates, just described, interlock so that each of the bosses 15DB and 15EB of the intermediate plates are nested in the adjacent recesses 15DD and 15ED of the closest adjacent intermediate plate 15‴, or are nested in apertures, which will be described below, in the first outer plate 15′ of the spacer assembly. The bosses 15DB″ and 15EB″ of the other outer plate 15″ are nested in staked relationship with associated depressions 15DD and 15ED of the next adjacent intermediate plate 15‴ of the spacer assembly 15. As mentioned above, similar orientation of all of the respective plates of the other laminated spacer assemblies used in the rotor 1, according to the invention, is employed in practicing the invention.

The bosses 15DB′ and 15EB′ on the closest plate 15′ to the main rotor lamination 9A comprise part of a mounting means for securing the spacer assembly 15 to the lamination 9A, as will be described in more detail below. At this point it should be noted that each outer plate 15′ is also formed with a pair of spaced apertures 15F and 15G, seen in FIG. 6, that are spaced apart a distance substantially equal to the distance between the staked portions 15D′ and 15E′ thereon. The apertures 15F and 15G are made about as large as the bosses 15DB and 15EB on the next adjacent intermediate plate 15‴ of the spacer assembly 15. These two apertures 15F and 15G are thus aligned to receive in staked relationship therein the bosses 15DB and 15EB of said next adjacent plate when the spacer assembly 15 is completed, in the form shown in FIG. 3. The other outer plate 15″ is also provided with a pair of spaced apertures 15F″ and 15G″, seen in FIG. 7, in order to enable each spacer assembly, such as the assembly 15, to be readily manufactured on a high speed punch press, according to the preferred mode of the invention. However, it should be noted at this point that in alternative embodiments of the invention, the outermost plates such as plate 15″, of each spacer assembly need not contain such a pair of spaced apertures. Further description of the purpose for these spaced apertures will be given below in connection with the discussion of the method of the invention. Thus, those skilled in the art can elect when it is desirable in a given application of the invention to incorporate such apertures (15F″ and 15G″) in such other outer plates of the respective spacer assemblies.

Referring again to FIGS. 2 and 3, the remainder of the mounting means for fastening each of the spacer assemblies, 15, etc., respectively, to the rotor lamination 9A will now be described. The rotor lamination 9A is formed to include two additional spaced apertures, such as the apertures 9D and 9E in association with each of the respective conductor apertures, such as the conductor aperture 9C. Thus, the mounting means for securing the spacer assembly 15 to the main rotor lamination 9A includes the two apertures 9D and 9E in the rotor lamination shown in FIG. 2 and the bosses 15DB' and 15EB', seen in FIG. A, on one side of the plate 15' of the spacer assembly 15 positioned closest to the rotor lamination 9A. The bosses are staked into the apertures to mount the spacer assembly 15 in aligned and fixed position relative to the rotor lamination 9A, so that the aligned conductor-receiving apertures in the respective plates of the assembly 15 are aligned with the conductor-receiving aperture 9C in the rotor lamination 9A. All of the other spacer assemblies are similarly oriented and mounted on associated end-most rotor laminations of the respective groups of laminations 4–9 in this embodiment of the invention.

An additional feature of the mounting means used in one preferred embodiment of the invention comprises a fusion weld formed between the rotor lamination 9A and each of the closest plates of the respective stator assemblies, such as the assembly 15. It has been found that such welds can be advantageously formed by a commercially available laser welding apparatus (not shown) that is used to apply a welding beam to the side of the laminations 9A opposite to the side thereof on which the spacer assemblies, such as assembly 15, are mounted. The weld is applied in a substantially circular pattern around the lamination 9A so the weld pattern intersects each of the spacer assemblies, such as assembly 15, at about mid-point between the pair of staked portions 15DB' and 15EB' thereon. Such a weld area is partly shown by the dashed line 20 in FIGS. 2 and 3. The laser weld forms a tack-weld between the juxtaposed surfaces of the rotor lamination 9A and the closest plate 15' of the spacer assembly 15, and also between all of the other spacer assemblies mounted on the rotor lamination 9A. It should be understood at this point that in some forms of the invention, the use of such a weld to supplement the mounting means of the invention is not required.

From the foregoing description of the preferred embodiment of the invention it will be understood that each plate of each spacer assembly, such as the assembly 15, includes two staked portions that each comprise a depression in one side of the plate and a boss on an opposite side of the plate. The bosses on all but one of the outer plates in each spacer assembly are, respectively, in aligned depressions or apertures, in an adjacent plate of the spacer assembly.

Also, in this embodiment of the invention one lamination, such as the lamination 9A shown in FIGS. 2 and 3, in each of the groups 4–9 of rotor laminations includes a plurality of pairs of additional spaced apertures, such as the apertures 9D and 9E seen in FIG. 2, and each such pair of additional apertures is positioned adjacent respective conductor-receiving apertures, such as aperture 9C in the lamination. Each said aperture in the additional pairs of apertures is positioned to receive in it, respectively, one of the bosses such as the bosses 15DB' and 15EB' in the closest plate, such as plate 15', of an adjacent spacer assembly. Thus, these additional apertures and the associated bosses serve to mount the spacer assemblies (15) in predetermined fixed positions relative to the rotor lamination 9A.

Each of the closest plates, such as the plate 15' of the respective spacer assemblies in the preferred embodiment of the invention includes two additional spaced apertures, such as the apertures 15F and 15G shown in FIG. 6, arranged to receive, respectively, one of the bosses 15DB and 15EB of an adjacent intermediate plate 15''' in order to fix the remaining plates in the spacer assembly 15 in a predetermined position relative to the closest plate 15' to the rotor lamination 9A, according to the invention.

Moreover, the two additional spaced apertures in each of the closest plates to the lamination 9A, of the respective spacer assemblies, such as assembly 15, are made substantially identical in configuration to the two depressions in the next adjacent intermediate plate 15''' of the spacer assembly. Finally, each spacer assembly 15 includes in the other outer plate 15'' thereof most remote from the rotor lamination 9A a pair of apertures 15F'' and 15G'' that are spaced apart a distance substantially equal to the distance between the bosses 15DB' and 15EB' on the first outer plate 15' of the assembly that is closest to the rotor lamination 9A. Each of the apertures 15F'' and 15G'' is made at least as large in area as the area in one of the bosses 15DB' or 15EB' on the plate 15'. These relative sizes are made such that the bosses 15DB' and 15EB' do not become securely locked in the apertures 15F'' and 15G'' of an adjacent spacer assembly when a plurality of spacer assembly plates are being sequentially punched and stacked together in groups of predetermined size, according to the method of the invention.

From the foregoing description of the structure of the disclosed preferred embodiments of the invention, it should be understood that when the respective laminated spacer assemblies are staked in position on the respective end-most laminations of the groups of rotor laminations 4–9, the spacer assemblies serve to form a liquid tight seal between the conductor-receiving passageways through the groups of main rotor laminations and the air ducts that extend radially from the axial coolant passageways 9B, 9B' etc. in the main rotor laminations and past the outer surfaces of the arcuately disposed spacer assemblies 15, 15A, 15B, etc. Moreover, since the respective plates of each spacer assembly are locked in position relative to one another by the locking means described above, and each of the spacer assemblies is mounted in aligned and fixed relationship to an adjacent main rotor lamination by the mounting means described above, the resultant rotor structure affords the advantages and objectives explained at the outset.

Practice of the invention to construct a laminated dynamoelectric machine rotor should be clearly understood by those skilled in the art, from the foregoing description considered in conjunction with the accompanying drawings; however, further clarification of the characteristic features of the invention will be provided by the following description of a preferred method for making such a rotor, according to the invention. In practicing the preferred method of the invention, to make a laminated rotor that includes cast conductors and radial coolant ducts for removing heat from the rotor, one should utilize the following process steps: First, provide from a suitable commercial fabricator a first plurality of metal rotor laminations, each having a plurality of conductor apertures and a plurality of coolant apertures punched therein at appropriately, arcuately spaced points, such as those illustrated in FIG. 2 of the drawing. Next, from the same, or any equivalent source of fabricated metal laminations, provide a second plurality of rotor laminations each of which are substantially identical in configuration to the laminations in the first plurality, except for the fact that each lamination in the second plurality is formed to include a plurality of pairs of additional apertures, and each such pair of additional apertures is positioned, respectively, adjacent to, and radially inward from, one of the conductor apertures in the lamination. Subsequently, the first and second pluralities of rotor laminations are arranged in groups and stacked so that one lamination from the second plurality of laminations is positioned at one end of each group, the remainder of which comprises laminations from the first plurality of main rotor laminations. Care should be taken in this stacking operation to align the conductor apertures in all of the rotor laminations of each group thereby to define conductor passageways that extend axially through each of the respective groups of laminations.

In addition to providing the foregoing component parts, one must, either simultaneously therewith, or subsequent thereto, provide from the same or a similar source of fabricated metal parts, a plurality of laminated metal spacer assemblies each of which have a conductor-receiving passageway therethrough. Each of the spacer assemblies are also formed to include a pair of bosses on one surface of an outer plate thereof so that the bosses are arranged to fit, respectively, into one of the apertures of a respective pair of the additional apertures formed in one of the main rotor laminations of the second plurality of such laminations noted above. Subsequently, the respective groups of rotor laminations are stacked with the spacer assemblies positioned between the groups of rotor laminations so that a conductor-receiving passageway in each spacer assembly is aligned with each conductor passageway in an adjacent group of rotor laminations. The stack of groups of rotor laminations and interposed pluralities of spacer assemblies are then compressed axially to seal the conductor passageways from the radial coolant ducts that extend from the axial coolant passageways defined by the coolant apertures in the rotor laminations to the periphery of the rotor, between the respective sets of pluralities of spacer assemblies.

Finally, to complete the rotor, the stacked groups of rotor laminations and spacer assemblies are secured in their aligned relationship and molten metal is cast in the conductor passageways in a conventional manner to mold axially-extending conductors in each of the passageways, and to secure the main rotor laminations and the spacer assemblies in their aligned relationship.

In the preferred method of the invention, in addition to positioning each of the above noted pairs of additional apertures in the second plurality of rotor laminations so that they are disposed radially inward from a conductor aperture, each of such pairs of additional apertures is formed so that they are spaced from one another and are arranged substantially in alignment with a radius of the main rotor laminations. Of course, other arrangements of such additional pairs of apertures could be used in modifications of the disclosed embodiment. Also in practicing the preferred method of the invention, in a best mode thereof, in addition to staking the respective plates of the laminated spacer assemblies to one another, a pair of spaced apertures is formed in each of the outer plate laminations of each spacer assembly. Also, spaced bosses are formed on each of the other intermediate plate laminations in each spacer assembly and each pair of such bosses is spaced apart a distance about equal to the distance between the pair of spaced apertures in the outer plate lamination of each spacer assembly. Finally, each of the spaced bosses is positioned in alignment, respectively, with one of the apertures in the above-mentioned outer plate lamination of each spacer assembly.

In a further alternative embodiment of the method of the invention, a pair of spaced apertures is formed in each of the other outer plate laminations of each of the spacer assemblies. Each of these pairs of apertures in the other outer plate laminations is spaced apart so that the two apertures of each pair have a distance between them substantially equal to the distance between the bosses in the first outer plate lamination of its spacer assembly, and the pair of spaced apertures is arranged generally in alignment with these bosses in the first outer plate member of the spacer assembly. The advantage of this final process step is that such spacer assemblies can be manufactured on a high speed, automated punch press which forms the respective apertures and bosses in each of the laminations and stakes a plurality of intermediate plates between said first and other outer plates of each spacer assembly, while at the same time preventing adjacent groups of the spacer assemblies from being staked together. Specifically, by providing the pair of spaced apertures in said other outer plate of each spacer assembly, those apertures are positioned to receive therein, respectively, the bosses on the first outer plate of an adjacent spacer assembly. The relationship between each of such pairs of apertures and the associated pair of bosses from the next adjacent spacer assembly in the manufacturing sequence is made such that the bosses fit loosely in the apertures, thus, they do not cause the adjacent spacer assemblies of the sequence to be staked together.

From the foregoing description of the best mode of the method of the invention, it will be apparent to those skilled in the art that some of the advantages that can be realized from practicing that method can also be realized by practicing various alternative arrangements of it. For example, rather than providing a first and a second plurality of differently configured main rotor laminations, it is possible to completely standardize the rotor laminations so that all of main rotor laminations are provided with conductor-receiving apertures, axial coolant passageway apertures and pairs of additional apertures associated, respectively, with each of the conductor apertures, as generally illustrated in FIG. 2. While only the pairs of additional apertures in the main rotor laminations closest to the sets of pluralities of spacer assemblies positioned between groups of rotor laminations would be used in practicing the invention, and some impairment of the flux carrying capabilities of the rotor would result from the other pairs of additional apertures in the other main rotor laminations, the standardization in manufacture thus achieved may warrant such a modification of the preferred method of the invention, and resultant rotor structure, in certain circumstances. Accordingly, it is my intention to encompass within the scope of the following claims all such modifications and alternative forms of the invention.

What is claimed is:

1. In a laminated rotor having cast conductors in spaced axially-extending passageways adjacent the peripheral surface of the stacked rotor laminations and having radial coolant ducts extending between spaced groups of the rotor laminations, the improvement comprising;

(a) a plurality of laminated spacer assemblies, each comprising a plurality of metal plates, locking means for securing such plates to each other in stacked relationship, and wall means defining an aperture through each plate, the apertures in all of said plates of each spacer assembly being positioned in alignment to define a conductor passageway through the assembly, and (b) mounting means fastening each of said spacer assemblies, respectively, to at least one rotor lamination of a respective juxtaposed group of rotor laminations with each spacer assembly conductor aperture aligned with a respective axially-extending passageway through the rotor laminations, thereby to define continuous axially-extending conductor passageways through the aligned rotor laminations and spacer assemblies, said continuous conductor passageways each being sealed from the radial coolant ducts by said wall means of the respective spacer assemblies.

2. An invention as defined in claim 1 wherein the metal plates forming said spacer assembly laminations are each about the same thickness as the thickness of one of the rotor laminations, and wherein each aperture through the respective spacer assembly plate members is approximately the same area and configuration in cross-section as the respective aligned passageways through the rotor.

3. An invention as defined in claim 1 wherein said locking means for securing the plates of the respective spacer assemblies to each other comprises inter-locking staked portions on adjacent plates of the spacer assemblies.

4. An invention as defined in claim 3 wherein each plate of said spacer assemblies includes two spaced staked positions that each comprises a depression in one side thereof and a boss on an opposite side thereof, said two staked portions of each plate being positioned on a line that generally parallels a longitudinal axis of the conductor aperture in said plate, and one of said staked portions of each plate being positioned adjacent the end of said plate farthest from the conductor aperture therein.

5. An invention as defined in claim 4 wherein said mounting means each comprises a fusion weld between said one rotor lamination and the spacer assembly plate closest thereto.

6. An invention as defined in claim 3 wherein each plate of each spacer assembly includes two spaced staked portions that each comprises a depression in one side thereof and a boss on an opposite side thereof, said bosses on all but one plate being nested in aligned depressions or apertures, respectively, in an adjacent plate.

7. An invention as defined in claim 6 wherein one lamination in each group of rotor laminations includes a plurality of pairs of additional spaced apertures each pair being, respectively, adjacent one of said conductor-receiving apertures therein, each of said apertures in the additional pairs of apertures being positioned to receive therein, respectively, one of the bosses on the closest plate of one of the plurality of respective adjacent spacer assemblies, thereby to fix said spacer assemblies in predetermined positions relative to said one rotor lamination.

8. An invention as defined in claim 7 wherein each said closest plate of each spacer assembly includes two additional spaced apertures arranged to receive therein, respectively, one of the bosses on the adjacent plate in the spacer assembly, thereby to fix the remaining plates in the spacer assembly in a predetermined position relative to said closest plate.

9. An invention as defined in claim 8 wherein said two additional spaced apertures in each of said closest plates are separated by a distance substantially equal to the distance between the two bosses on said closest plate.

10. An invention as defined in claim 9 wherein the two additional spaced apertures in each of said closest plates are substantially identical in configuration to the two depressions in the next adjacent plate on each spacer assembly.

11. An invention as defined in claim 8 wherein each said mounting means includes a fusion weld between said one lamination of each group of laminations and said closest plate of the respectively adjacent assemblies.

12. An invention as defined in claim 11 wherein said fusion weld is formed by a laser beam applied to the side of said one lamination of each group of laminations that is opposite to the side thereof on which said spacer assemblies are mounted.

13. An invention as defined in claim 8 wherein each spacer assembly includes in the plate thereof most remote from said one rotor lamination a pair of apertures that are spaced apart a distance substantially equal to the distance between the bosses on said closest plate of the spacer assembly to said one rotor lamination, each aperture in said most remote plate being at least as large in area as the area of one of the bosses on said closest plate.

* * * * *